United States Patent
Marchesi et al.

(10) Patent No.: US 6,521,856 B1
(45) Date of Patent: Feb. 18, 2003

(54) METHOD AND DEVICE FOR CONTROLLING A DIE-SINK EROSION MACHINE

(75) Inventors: Alberto Marchesi, Gordevio (CH); Luciano Riva, Verbania-Intra (IT)

(73) Assignee: Agie SA, Losone (CH)

( * ) Notice: Subject to any disclaimer, the term of this patent is extended or adjusted under 35 U.S.C. 154(b) by 0 days.

(21) Appl. No.: 09/453,452

(22) Filed: Dec. 3, 1999

(30) Foreign Application Priority Data

Dec. 4, 1998 (DE) .......................................... 198 56 098

(51) Int. Cl.$^7$ ................................................. B23H 1/00
(52) U.S. Cl. ................................ 219/69.13; 219/69.15; 219/69.17; 700/179
(58) Field of Search ........................... 219/69.13, 69.18, 219/69.11, 69.1, 68, 130.21, 130.01, 69.15–69.17; 323/283, 292; 700/179–183

(56) References Cited

U.S. PATENT DOCUMENTS

| | | | |
|---|---|---|---|
| 4,404,506 A | | 9/1983 | Nishimura et al. |
| 4,547,854 A | * | 10/1985 | Hashimoto et al. |
| 4,608,644 A | * | 8/1986 | Kiya |
| 4,608,645 A | | 8/1986 | Niwa et al. |
| 4,992,948 A | | 2/1991 | Pilland et al. |
| 5,081,332 A | | 1/1992 | Sakuragawa |
| 5,378,218 A | | 1/1995 | Daimaru et al. |
| 5,408,064 A | * | 4/1995 | Takahara |
| 5,914,883 A | | 6/1999 | Riva et al. |
| 5,984,506 A | | 11/1999 | Robbiani et al. |
| 6,225,589 B1 | * | 5/2002 | Bartok |

FOREIGN PATENT DOCUMENTS

| | | | |
|---|---|---|---|
| DE | 2128667 | * | 12/1972 |
| DE | 32 46 268 | | 7/1983 |
| DE | 196 14 202 | | 11/1997 |
| DE | 197 24 926 | | 12/1997 |
| EP | 0 311 703 | | 10/1987 |
| EP | 295264 B1 | * | 2/1993 |
| EP | 0 801 340 | | 4/1997 |
| JP | 63-252688 | * | 10/1988 |
| JP | 8-197337 | * | 8/1996 |
| JP | 10-263988 | * | 10/1998 |
| WO | WO-95/11488 | * | 4/1995 |

OTHER PUBLICATIONS

1. Hoppmann, R. and Ising U., "Computergestutzte Werkzeugverwaltung in Bearbeitungszentren", etz Bd. 110 (1989), heft 20, pp. 1072–1075.
2. "Low–cost–CNC: Fit mit 32 bit", VDI–Z 132 (1990), Nr. 11—Nov., pp. 113–121.
3. Herrscher, A. and Walter, W., "Unterschiedliche Maschinen mit einem System programmieren", Werkstatt und Betrieb 123 (1990) 2, pp. 113–117.

(List continued on next page.)

*Primary Examiner*—M. Alexandra Elve
*Assistant Examiner*—Jonathan Johnson
(74) *Attorney, Agent, or Firm*—Burns, Doane, Swecker & Mathis, L.L.P.

(57) ABSTRACT

A method and a device are for controlling multiple machining processes in a die-sink erosion machine with several identical or different electrodes (R1, R2, R3, R4), whereby the machining sequence of the machining processes and the electrode used for each machining process are determined by providing the following criteria: a) predefining priorities of workpieces to be machined, of a group of machining procedures, of individual machining jobs (ARB), of work cycles (AZ) and/or work steps (AS) of a machining job; and/or (b) predefining the life span or wear limit of the electrodes used for the individual machining jobs, work cycles or work steps. The overall machining on the die-sink erosion machine is performed with consideration of the determined machining sequence.

15 Claims, 9 Drawing Sheets

OTHER PUBLICATIONS

4. "NC/CNC Handbuch '92" by Hans B. Kief; 1992; pp. 194–195 and 370–372.

5,. "Objektorientiert Programmierein," Prof. Dr.–Ing. Eversheim Lenhart; Industrie–Anzeiger 82/1991, p. 38–40.

6. Storr, A., Hofmeister, W.: Strukturen zur Programmierung von NC–Mehrschlittendrehmaschinen, In: wt–Produktion und Management 84, 1994, p. 26–30.

7. Batz, Thomas et al.: Objektorientierte Modellierung von Produktionsprozessen. In: Informatik Forsch. Entw., 1995, p. 26–40.

8. Planken, Bettina, et al.: Mit der richtigen Entwicklungsumgebung zum Erfolg. In: Elektronik, 25, 1994, p. 111–124.

* cited by examiner

METHOD AND DEVICE FOR CONTROLLING A DIE-SINK EROSION MACHINE

CROSS REFERENCE TO RELATED APPLICATIONS

The present application corresponds to German Patent Application No. 198 56 098.2, which was filed in Germany on Dec. 4, 1998, and the entire contents of which are hereby incorporated herein by reference.

BACKGROUND OF THE INVENTION

1. Field of the Invention

The invention at hand relates to a method for controlling a number of machining processes on a die-sink erosion machine and a device suitable for this purpose.

2. Description of Related Art

Such a die-sink erosion machine is used, among other purposes, for manufacturing casting molds with extremely high machining precision. Hereby a number of machining processes which themselves are divided into several working steps and working cycles of different machining stages or phases are performed on one or more workpieces. Depending on the machining phase, such as roughing or finishing, often different electrode categories, such as, for example, roughing or smoothing electrodes, are used for performing these machining processes. If, in addition, the geometry of the performed machining job changes, the electrode must be exchanged in most cases also. This means that depending on the number, versatility, and quality requirements of the machining processes to be performed in a modern die-sink erosion machine, the order of the work steps to be performed and the electrodes required in each case requires an exact specification that is stored in a control program of a numerical control of the die-sink erosion machine.

When setting up the die-sink erosion machine for such a complex machining job, the machine operator must set the control inputs in the control device that determine which work steps of a machining process must be performed in which sequence with which electrode on which workpiece. Standard, state-of-the-art control processes of the initially mentioned type require control inputs in the form of closed "programs", so-called sequential control programs, for this purpose. Such a control program specifies all control data in respect to machining, machining frequency, and electrode used for each point in time during the overall machining. Given the multiple work steps in a complex machining of several workpieces that must be performed and the different electrodes necessary for this purpose, the machine operator easily loses track, so that setup errors could occur that would result in an improper, but at least uneconomical execution of the machining.

The state of the art indeed knows of methods for the so-called object-oriented programming of machine tools, for example from Prof. Dr. Ing. Eversheim, Dipl.-Ing. Lenhart, Objektorientiert Programmieren, in: Industrie-Anzeiger 82/1991, p. 38–40. In contrast to sequential control programs, program components are used here that can be reused over and over again for changing the control program. Hereby only an object-oriented structure of the source program is suggested. But no tool for creating certain machining sequences is made available to the machine operator.

OBJECTS AND SUMMARY

The invention at hand attempts to improve die-sink erosion machines in respect to their user friendliness where the creation of new machining sequences is concerned.

According to one aspect of the present invention, a method controls multiple machining processes in a die-sink erosion machine with several identical or different electrodes, whereby the machining sequence of the machining processes and the electrode used for each machining process are determined with consideration of the following predefined criteria: a) predefining priorities of workpieces to be machined, of a group of machining jobs, of individual machining jobs, of work cycles and/or work steps of a machining job; and/or (b) predefining the life span or wear limit of the electrodes used for the individual machining jobs, work cycles or work steps. The overall machining on the die-sink erosion machine is performed with consideration of the determined machining sequence. To create the machining sequences, a device according to one aspect of the invention for controlling the die-sink erosion machine has, for example, a CNC controller: at least one data memory for the permanent storing of data describing the electrodes required for the respective machining processes; a user interface for inputting the previously mentioned criteria for determining the machining sequence into the control device; and a sequence generator that automatically generates the suitable machining sequence for the performing the multiple machining processes based on said criteria and electrode data.

The invention therefore offers the machine operator a proven tool for setting even complicated machining sequences on a die-sink erosion machine in a relatively simple manner and short time. The creation of the sequence and therefore also of the control program and the subsequent machining also takes into account tool wear, for example, by predefining the tool life span as the maximum number of possible work cycles for each machining type, for example for roughing and smoothing cycles. Once the predefined wear limit of a tool is reached, a tool administration or management system according to one aspect of the invention preferably excludes the tool from further machining or downgrades it to a different tool category, as will be described in more detail below. In this way, the selection of the favorable machining sequence according to the invention is based on the fact that the available electrode material is optimally used, i.e., each electrode is used for several machining processes with or without interruption until its individual life span expires. Another outcome of predefining suitable machining priorities is also that a certain object will be machined before another object is completed. It would be possible, for example, that a certain workpiece would need to be machined with a higher priority because a customer needs this workpiece immediately, or a specific, complicated machining job is moved ahead so that in the case of a failure a workpiece which was already machined with great effort is not lost. A specific predefining of priorities also makes it possible to perform several machining jobs in as little time as possible, and to minimize any traveling distances between machining jobs during which no erosion is possible as much as possible.

The method according to one aspect of the invention and the corresponding device naturally can be transferred to other types of machine tools in which comparable wear symptoms of the used tools occur and/or similar machining priorities can be used.

The term "machining process" has been used in this document as a general term comprising all parts of the work performed on a die-sink erosion machine. This includes the execution of a particular die-sink with a predefined die-sink geometry which is called a "machining job". Each machining job is performed in several machining steps or phases, for example, in consecutive order, roughing, pre-smoothing, smoothing, and finishing. In each machining phase, a machining job again consists of several work steps that may be combined into so-called work cycles. The term "machining sequence" therefore in general relates to the order of the consecutively performed machining processes which, depending on the type of machining process, may be the order of consecutively performed machining jobs, work cycles of several machining jobs and/or work steps in a work cycle of a certain machining job or combinations of these sequences.

An especially preferred embodiment of the method uses the so-called wear distribution strategy as a selection criterion for performing several identical machining jobs. The individual machining jobs are hereby not completed in their respective entirety, one after the other, but the consecutively performed machining processes are instead distributed in such a way over several machining jobs that an even distribution of the electrode wear over a certain number of work cycles and/or work steps of the multiple machining jobs is obtained. It is known that a sinker electrode experiences electrode wear during the machining, which can be attributed to the electrophysical nature of the erosion process so that the sinker electrode wears after performing a certain number of work steps. Therefore, in order to maintain the most homogeneous machining quality possible for all machining jobs, it is advantageous to perform all identical or equally ranked working steps of multiple machining jobs consecutively, for example, starting with all first work steps of the multiple machining jobs, then all second work steps, etc., until all of the last work steps of the multiple machining jobs have been performed.

In this connection, the multiple, identical machining jobs of a wear distribution area are preferably performed consecutively in a certain order, for example 1-2-3-4, and after a first (1) or last (4) machining job are repeated in reverse order, i.e., 4-3-2-1, until all work steps of the machining jobs have been performed. This embodiment of the wear distribution strategy avoids that one machining job is machined with privileges over another. As a result, the wear distribution strategy makes it possible that all identical machining jobs are eroded equally well (or equally poorly). In the proposed embodiment, the electrode quasi moves in "pendulum" fashion through the rows of equally ranked work steps of several machining jobs, from the first to the last machining job, from the last to the first, etc., until all work steps of the machining jobs have been completed (so-called pendulum method), so that all machining jobs are completed very quickly.

It is also preferred that the maximum electrode wear of an electrode is defined by the maximum number of work cycles or work steps that can be completed with this electrode, whereby this number at the same time determines the group of work cycles or work steps in which the wear distribution strategy is used. In this manner, several work cycles of a certain machining phase are, for example, combined into so-called wear distribution groups which are in each case machined only with a single electrode. After the wear distribution group has been completed, the life span of this electrode for the respective machining phase has expired. This ensures in a particularly clear manner that all electrodes are used completely.

The machining sequence in such a wear distribution group again can be set according to the wishes of the machine operator, for example, preferably so that only selected areas of work steps in a group of work cycles are included in the wear distribution strategy. Only the last two work steps in several work cycles of several machining jobs that were combined into a wear distribution group are supposed to use an even distribution of the wear of the used electrode, preferably in a pendulum method, as mentioned above.

The information on the life span of an electrode of the die-sink erosion machine, i.e., the maximum number of work cycles or work steps of a certain machining phase for which an electrode can be used and the current wear status can be obtained in various ways. In the case of a die-sink erosion machine in which several machining jobs, each of which has several work cycles, are performed consecutively, the maximum electrode wear is preferably predefined for use in an electrode administration system using the maximum number of work cycles or work steps that can be performed with one electrode, and the electrode administration system counts and registers the number of performed work cycles or work steps during the machining. The information regarding the electrode life span makes it possible to set up an automatic electrode administration or electrode management system in the controller of the die-sink erosion machine. If a certain electrode has reached the predefined wear limit, it is automatically excluded by the administration system from further machining or is assigned to another machining phase, i.e., to another electrode category for which this electrode can still be used. The entire electrode administration takes place via an intelligent CNC controller of the machine.

It is preferred that the electrodes are described in the administration system of the control device by way of a current machining status, whereby the latter is adapted during the course of the machining in relation to the electrode wear. The electrode administration according to the invention therefore monitors the wear status of the used electrodes which are, for example, available in an electrode changer, and assigns to them storage status properties, such as "usable", "unusable" or "downgraded to roughing electrode", etc.

To perform a machining sequence, the controller also needs detailed information about the electrodes used in each work step of the machining sequence. According to an especially preferred exemplary embodiment, the data for describing the electrodes in the control device are divided for this purpose into the following groups and administered accordingly:

abstract electrode data for describing a standard electrode (V1, V2) that contain information for performing a certain machining process; and, specific electrode data for correcting and/or adapting the abstract electrode data to the actually used electrode (R1, R2) or to machine-specific characteristics, whereby the electrode description is obtained by linking the abstract electrode data with the specific electrode data.

The abstract electrode data already contain all essential information about the electrode(s) planned for performing a specific (individual) machining job in a specific type of machining. This is a description of standard or specified electrodes required for performing a specific, desired machining job, whereby this abstract description also contains all machining-specific information of the electrode, for example the basic electrode geometry, the basic electrode shape, the electrode material, the electrode category, for example whether it is a roughing or a smoothing electrode. The specific electrode data then contain only the correction data, for example in respect to the exact dimension of the actually used electrode, such as the actual, smaller than specified size which may differ from the (assumed) smaller than specified size of the prescribed tool, as well as machine-specific data, such as, for example, the exact chucking position of the electrodes, the current position in an electrode magazine for an automatic electrode change and/or the current wear status of the actually used electrode, as it is registered in the above mentioned administration system. The idea is therefore to generalize the electrode description, i.e., to abstract it in the description of a standard tool independently from the actually encountered situation in the die-sink erosion machine and the real electrodes used, so that the electrode description can already be performed before the actual machining, outside the workshop. It is preferred that an intelligent data generator automatically determines the machining sequence with the technology and process parameters of individual work steps of the desired machining job on the basis of the abstract electrode data together with the sequence selection criteria according to the invention and geometrical data and technology and process parameter sets available in databases.

Another criterion for selecting and determining the machining sequence is the predefining of priorities. There are different preferred possibilities for adapting the desired machining sequence to the corresponding circumstances for this purpose.

In one embodiment, the machining sequence is determined as a matter of priority by the priorities assigned to the workpieces, groups of machining jobs, and individual machining jobs within a group ("workpiece" strategy). The machining job with the highest priority in the group is hereby performed first on the workpiece with the highest priority, from the first work step to the last one. Hereby no wear distribution is employed for the used electrode, since only one machining job is always performed after another, i.e., the machining processes are not distributed over several machining jobs. It is preferred that with the "workpiece" strategy the electrode wear is actively counted, whereby, for example, the respective electrode is assigned the storage status "unusable" in the electrode administration after the wear limit has been reached.

In another embodiment, the machining sequence of machining jobs performed in several machining steps or phases, such as, initially, roughing, then pre-smoothing, etc., and where in each machining phase the work steps of a single machining job in each case have been combined into work cycles, is determined as a matter of priority by the fact that all work steps of all machining jobs are performed in the predefined hierarchy of the machining phases. For example, in the case of several die-sinks, first all work steps of the roughing cycles, then all work steps of the pre-smoothing cycles, etc., are performed. Depending on the desired machining quality, this strategy also distinguishes: (a) the "phase" strategy, in which all work steps in each machining phase are performed consecutively from start to finish of a machining job, then all work steps of the next machining job are performed from start to finish, etc., until the last machining job of the same machining phase has been performed; and (b) the "phase 0" strategy, in which initially all first work steps of several machining jobs of the same machining phase are performed, and then, based on the last machining completed, the remaining work steps of the machining jobs are completed as described for the "phase" strategy. Because these "phase" and "phase 0" strategies distribute the machining sequence in a specific machining phase over several machining jobs, it is particularly advantageous to additionally use the above described wear distribution strategy here. For example, given a specific wear limit of an electrode type, such as the roughing electrode, a wear distribution group consisting of, for example, four roughing cycles distributed over four identical machining jobs, is formed. Within this wear distribution group it is also possible to limit the wear distribution function only to the first two work steps per cycle, and to use the progression of the "phase 0" strategy for the remainder.

Other possibly advantageous embodiments include those in which the machining sequence is assigned as a matter of priority according to the priority of a workpiece and the strategy specified for the workpiece ("piece" strategy), or as a matter of priority according to the priorities assigned to the individual work steps ("work step" strategy). The latter makes it, for example, possible to set the machining sequence to the lowest level of the machining processes, so that the machine operator is also able to predefine individual sequences of work steps for the control device.

It is also especially preferred that combinations of the mentioned strategies, such as of the "workpiece" strategy and the "phase" or "phase 0" strategy are used.

In a first combination embodiment, the machining sequence is as a matter of priority determined by the "workpiece" strategy, whereby the workpieces, groups or machining jobs are completed with same priority using the "phase" or "phase 0" strategy (so-called "workpiece-phase" or "workpiece-phase 0" strategy). This combined strategy is suitable in particular in connection with a "cascade-type" downgrading of the used electrodes, whereby those electrodes used, for example, in a work cycle of a high phase, for example a smoothing cycle of the machining job with the highest priority, can still be used for machining jobs of lower priority after the expiration of their life span for one or more work cycles of a lower phase, for example, a roughing cycle. If, in addition, a wear distribution strategy is desired for the work cycles to be performed, the former naturally can be set for machining jobs with the same priority.

In a second combination embodiment ("phase-workpiece" or "phase 0-workpiece" strategy), the machining sequence is influenced according to the "phase" or "phase 0" strategy to the extent that the sequence of work steps and possibly the order of the division of the wear distribution groups take into account the priority of the machining jobs according to the "workpiece" strategy.

BRIEF DESCRIPTION OF THE DRAWINGS

The following describes preferred exemplary embodiment of the invention in reference to the enclosed drawings. This will show additional advantages and characteristics of the invention. In the drawing.

DETAILED DESCRIPTION OF THE PREFERRED EMBODIMENTS

The invented control and electrode administration concept of a die-sink erosion machine will now be described in reference to the example of preferred machining sequences and their associated strategies. But these should not be understood to limit the invention. Depending on the selection and weighting of the selection criteria described initially, an almost unlimited number of different machining sequences with associated description of the technology can be created.

Figure 1:
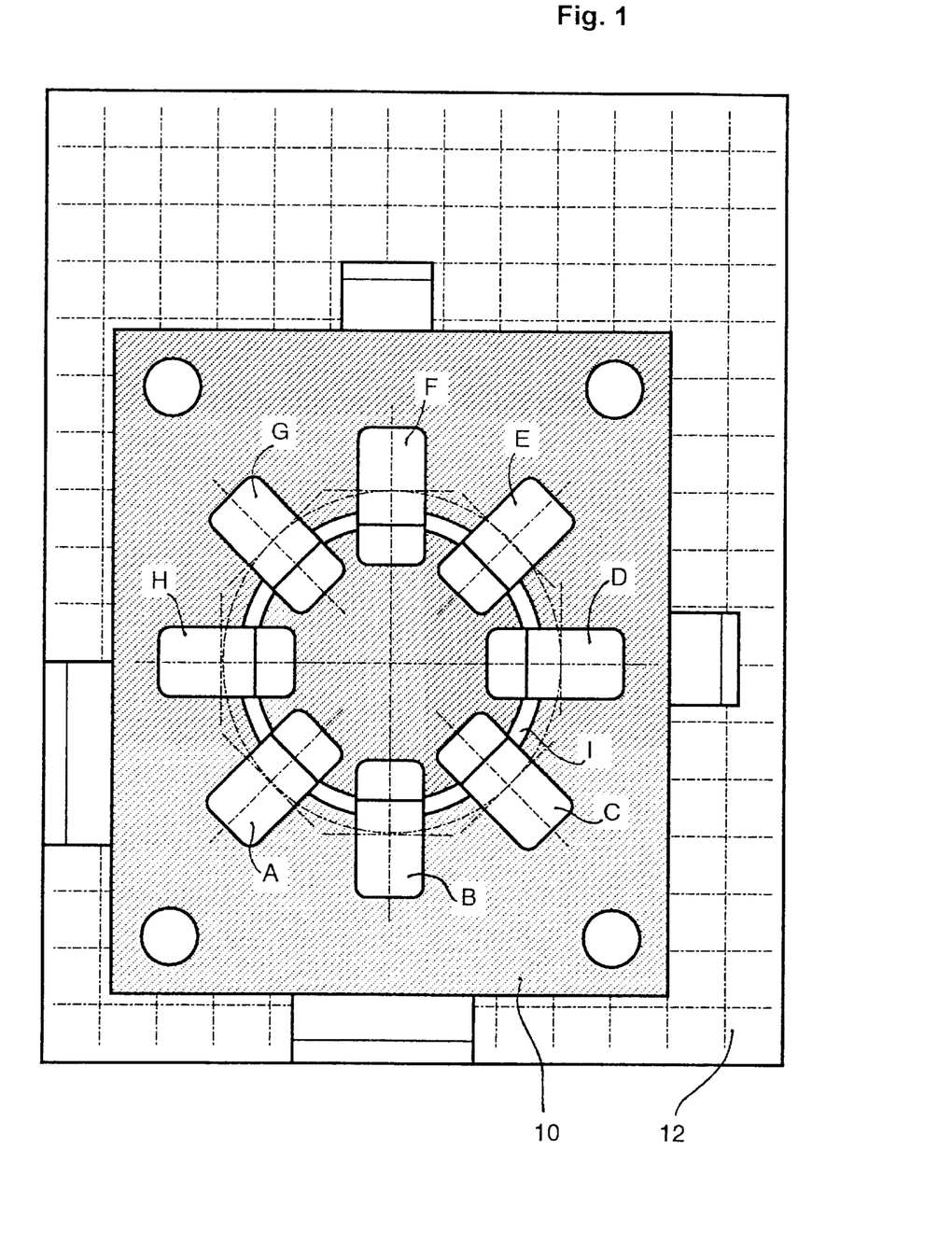
FIG. 1 shows a schematic top view of a casting mold with several die-sinks that can be produced with a die-sink erosion machine.
Figure 2A:
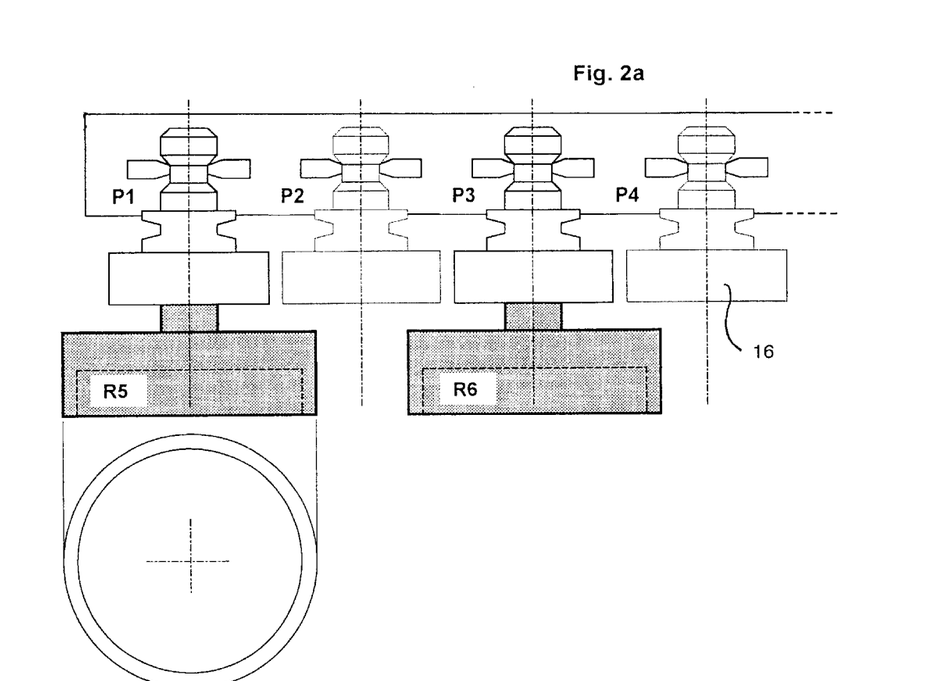
FIGS. 2a,b show a schematic view of an electrode changer in a die-sink erosion machine with several sinker electrodes arranged in electrode holders.

In connection with FIGS. 1, 2a,b, and 3, a first example of the invented creation of a certain machining sequence for a workpiece with several machining jobs, i.e., die-sinks having an identical or different geometry, is explained. For example, a suitable casting mold for the serial production of a rubber damper element for a differential coupling is supposed to be produced on a die-sink erosion machine. FIG. 1 shows a workpiece 10 that has the final shape of a mold half of such a casting mold. This means that the die-sink erosion machine will be used to make eight die-sinks A to H in the workpiece, offset from each other by 45° each, as well as an annular die-sink I. Two mold halves must be produced hereby, i.e., the identical arrangement of die-sinks A to I on another workpiece 10(not shown). The workpiece 10 is here mounted on a pallet 12 that is positioned on the tool table of the die-sink erosion machine.

Figure 2B:
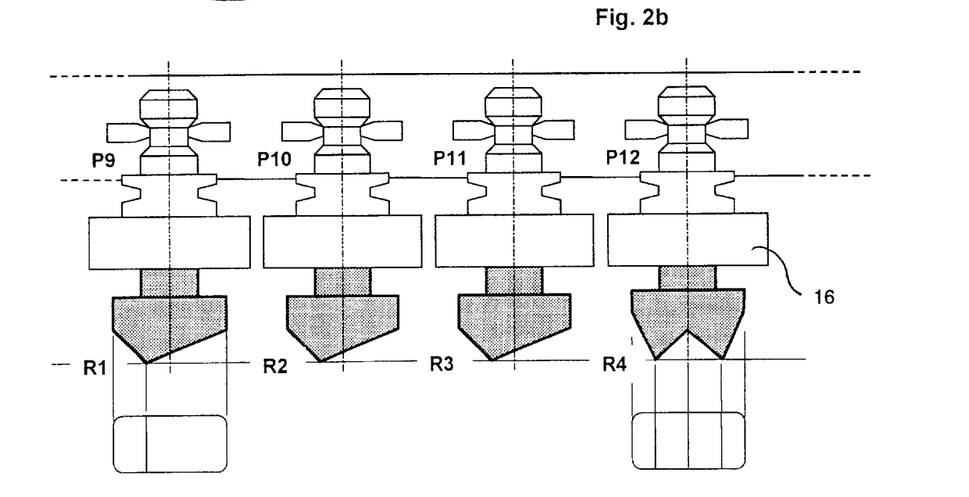

The machining processes planned for the workpiece 10 therefore include a total of nine machining jobs, each of which requires at least two machining phases, i.e., a roughing and a subsequent pre-smoothing phase. Each phase again comprises several work steps for each machining job, where these work steps are again combined into so-called work cycles. The selection of the machining sequence, i.e., the order of the phases, of the work steps of a work cycle to be completed, and the work cycles per phase, depends on the selection of the machining strategy which again depends, among other things, on the number of required and available sinker electrodes of the different categories and on their life span. In the case at hand, the machine operator is primarily concerned with performing the total machining job on the workpiece 10 as quickly as possible, i.e., to avoid periods of standstill, and to utilize the available electrodes as best as possible, i.e., to use each of them to its wear limit. The number of available electrodes is limited, for example, by the storage capacity of an electrode changer of the die-sink erosion machine, where this electrode changer changes the used electrodes several times during the course of the overall machining job of a workpiece. FIGS. 2a and 2b show a section of such an electrode changer with a total of twelve electrode holders 16 in positions P1 to P12. Several electrodes required for the machining of the workpiece 10 in FIG. 1 are so wide that they require more than one holder space in the electrode changer. This means that the shown electrode changer has only just space for a total of ten electrodes R1, R2, . . . R10 required for producing the two mold halves of FIG. 1. An optimum utilization of the electrode material is ensured if five sinker electrodes are used for the total machining of one mold half according to FIG. 1, i.e., three electrodes for producing the actual damper element die-sinks A to H, and two electrodes for the die-sink I of the connecting ring.

The controller of the die-sink erosion machine has an electrode administration system that records the current wear status of each electrode and changes it during the machining, if required. For this purpose, the life span of an electrode is predefined in the administration system, i.e., in the form of the maximum number of work cycles that can be performed for each phase of a special machining job. The electrode administration system is also provided with a counter device that continuously counts the number of work cycles completed and stores them in a memory of the administration system. If a specific electrode now reaches the maximum permissible number of work cycles, the electrode is excluded from the administration system either from further use, i.e., it is assigned the storage status "unusable", or if possible the electrode is downgraded to another electrode category for use in another machining phase. In the latter case, the machine operator activates the option "Electrode movement with downgrading" in the electrode administration system, hereby setting the control device so that the pre-smoothing electrodes are automatically downgraded to roughing electrodes once they reach their wear limit and are used during the further course of the machining as such.

The following criteria are used for the additional determination of the machining sequence in order to produce the mentioned mold parts: first all first work steps of the roughing cycles of machining jobs A to H should be performed, so that the initially described "phase 0" strategy is selected for this. Then the roughing cycles should be eroded as quickly as possible, so that the control device is set to the "phase" strategy. During the pre-smoothing cycles which represent the last machining phase in this case, an even distribution of the electrode wear over the different machining jobs A to H is desired in order to maintain a homogeneous machining quality. The machine operator therefore selects the previously described wear distribution strategy and sets the control device to the "Wear distribution over entire machining phase" option.

In the area of the wear distribution, the inevitable electrode wear is then distributed evenly over equally ranked work steps of several machining jobs in the same phase. The machine operator also predefines the life span or wear limit by setting the maximum permissible number of work cycles per machining phase in the electrode administration system. This number at the same time determines the size of that group of work cycles of a phase in which the wear distribution strategy will be used (so-called wear distribution group). Each wear distribution group is machined with a single electrode of the associated category; after the group has been completed, the electrode has at least for this phase reached its wear limit. Using a pre-smoothing electrode, at least four pre-smoothing cycles can be performed with wear distribution, for example; after this, the electrode has reached its wear limit as a pre-smoothing electrode. The same electrode theoretically now can be used also for performing four or more roughing cycles, i.e., as a roughing electrode. After this, the electrode is generally no longer usable.

The specification for the machining sequence for performing the circular die-sink I in FIG. 1 is accomplished in a similar manner. The die-sink I should be performed with a single roughing electrode and a single pre-smoothing electrode.

Figure 3:
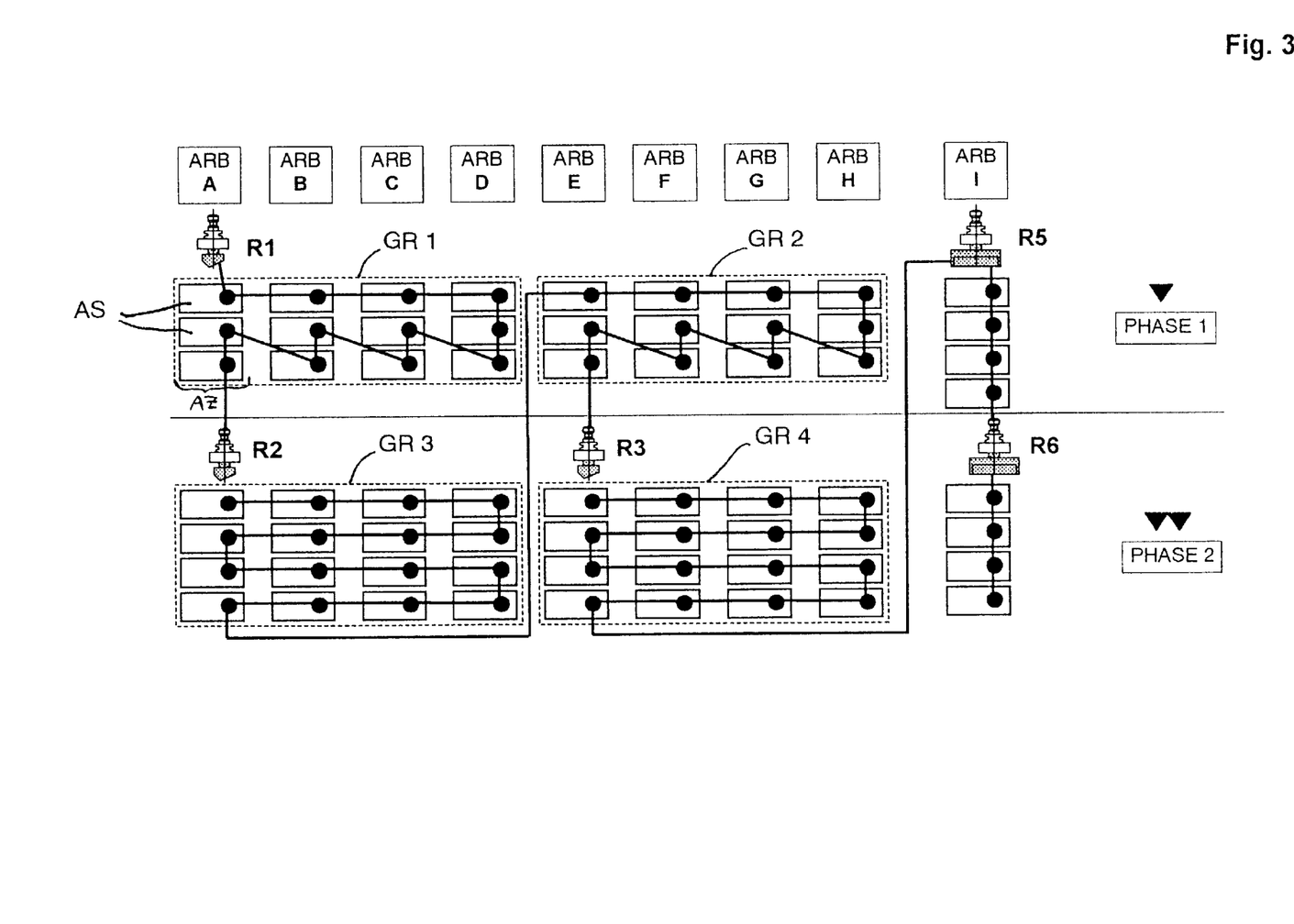
FIG. 3 shows a schematic view of a machining sequence for performing several machining jobs with different electrodes.

Using these presets, the control device automatically generates the entire sequence of the work cycles for producing the eight damper element die-sinks A to H and the circular die-sink I in the workpiece 10 according to FIG. 1, and also determines which electrodes to use in each case. FIG. 3 shows a schematic of this machining sequence. Die-sinks A to I each have been designated with ARB A to ARB I. A roughing cycle (machining phase 1) and a pre-smoothing cycle (machining phase 2), each consisting of three or, respectively, four work steps AS has been provided for each of the die-sinks A to H. Based on the above predefined wear limit of a maximum of four work cycles AZ for the roughing and pre-smoothing electrodes, the roughing and pre-smoothing cycles are in each case combined into groups GR1 to GR4 of four work cycles AZ, each of which is machined with a single electrode.

According to the sequence in FIG. 3, the control device first gets an electrode R1 from position P9 in the electrode changer of FIG. 2. This is used to first complete the roughing cycles of die-sinks A, B, C, and D in the first group GR1, i.e., according to the predefined "phase 0" strategy, first all first work steps AS of the four die-sinks A, B. C, and D, and then the remaining work steps AS are performed, whereby in the order of the die-sinks D, C, B, and A the second and third work steps AS of each work cycle AZ are consecutively completed before the next die-sink is further machined. After completion of the first work cycle group GR1, the electrode R1 is again placed back into the electrode changer and is automatically exchanged for an electrode R2 from position P10. At the same time, the electrode administration system of the controller stores the status of the electrode R1 as "unusable". The electrode administration system obtains further information about the wear status of the remaining electrodes via the predefining of the maximum number of work cycles that can be performed and the continuous counting of already performed work cycles.

The new electrode R2 is then used to perform the pre-smoothing cycles of die-sinks A, B, C, and D in group GR3, i.e., according to the set wear distribution strategy by using the so-called pendulum method in which first all first work steps AS of die-sinks A, B, C, and D, then all second work steps AS are completed in reverse order D, C, B, A, etc., until the last work steps AS in group GR3 are performed. Now electrode R2, which had been initially used as a pre-smoothing electrode, is downgraded by the electrode administration to the category of a roughing electrode since it has already performed the four maximum permissible pre-smoothing cycles. Electrode R2 is now used again as a roughing electrode for machining the die-sinks E, F, G, and H, i.e., according to the "phase 0" strategy applicable for the roughing cycle, which means according to the same machining sequence as group GR1. After completing the work cycle group GR2, the electrode R2 now has also reached its wear limit for a roughing electrode and is therefore downgraded by the electrode administration as generally "unusable". The pre-smoothing cycles of die-sinks E, F, G, and H are finally performed with a new electrode R3 from the electrode changer. Then electrode R3 is also downgraded; theoretically it would still be suitable as a roughing electrode for machining another tool.

After all damper element die-sinks A to H have been eroded, the control device gets another electrode R5 from position P1 in the electrode changer and performs the intended roughing cycle according to the sequence in FIG. 3, and following this performs the pre-smoothing cycle for die-sink I with another electrode R6.

To perform such a machining sequence, the CNC machine controller also requires control inputs in respect to the used electrode types, geometry data of the die-sinks, the quality goal and machining speed, as well as the process and technology parameters, such as erosion current, pulse shape, pulse frequency, flushing data, etc. Together with the above mentioned predefinitions for the machining sequence, these data are also used to determine the sequence of the individual work steps using the respective technology and process data. The invention at hand also provides the machine operator with a tool for more efficiently describing the various electrode categories. For this purpose, different electrode categories for performing a specific machining job, for example one of the die-sinks A to I in FIG. 1, are combined into an electrode family and are considered as an object in an object-oriented structure of the die-sink erosion machine controller. Accordingly, the same electrode family then includes all those electrodes that have at least the same basic geometry and a predefined smaller than specified size that is able to achieve the same final dimensions. An object of the electrode family can be used for several (identical) machining jobs, i.e., for all machining jobs in which a corresponding die-sink geometry should be achieved.

According to the invention, three data areas are provided in the controller for describing the electrodes:

a) Data of the Electrode Family (So-called Family Data)

The family data contain information applicable for all electrodes of a specific electrode family. This includes essentially information about: electrode material (the choice of the electrode material determines the paired materials (electrode/workpiece) of the erosion, so that the controller will be able to automatically determine the matching technology parameters. But if the members of an electrode family are made of different materials, the electrodes differing from the material data defined on the family level must be specified on a subsequent data level); as well as basic electrode geometry, i.e., information about the basic shape (for example, prismatic, lamella-shaped, pointed, or standard shapes), and information about the basic geometric dimensions.

b) Abstract Electrode Data (Data of So-called Virtual Electrodes)

The abstract electrode data contain information about virtual electrodes planned for performing a specific machining job in a specific machining type or phase.

This is a description of a standard or specified electrode for performing the specific machining job, which already contains all essential machining-specific information. The abstract electrode data include, for example, information about: electrode category for a specific machining type, for example, roughing, pre-smoothing, smoothing, or finishing electrode; number of planned virtual electrodes per machining type; theoretical smaller than specified size or standard smaller than specified size (smaller than specified size= diameter of final mold minus diameter of electrode) which may slightly differ from the smaller than specified size of the actually used (real) electrode (the controller automatically determines the pulse frequency and number of pulses per electrode, along with the required quality goal, from the number of electrodes and the expected, smaller than specified size); and the electrode life span expressed as the number of maximum permissible work cycles per machining phase.

c) Specific Electrode Data (Data of So-called Real Electrodes)

These are essentially correction data in contrast to the abstract electrode data of the virtual electrodes for adapting the actually used real electrodes to a (single or multiple) performing of a specific machining job. These correction data on the one hand relate to electrode-specific properties, for example the actual smaller than specified size of the used electrode or information about the current electrode wear status, and on the other hand to machine-specific properties, such as information about the mode of the electrode change and position of the electrode on an automatic electrode changer or robot, information about the installation of the electrode in the die-sink erosion machine for example, whether it is installed on the electrode head or on the tool table correction values of the electrode position in order to determine the exact zero point of the electrode in relation to the zero point of the electrode head, etc.

The total information about an electrode to be used for a specific work cycle is obtained from the sum of the specific electrode data of the real electrode, the abstract electrode data of the virtual electrode, and the superordinate family data. This way of dividing and grouping the electrode description promotes the generation of various machining sequences, since it permits a flexible and quick adaptation of the electrode description to a changed machining sequence and the electrodes required for this, for example, new electrodes. If, for example, a new real electrode is used which is positioned in a new position in the electrode changer, it is sufficient to only input the real data of this electrode into the controller and link them with the already existing virtual data of the desired machining type.

Figure 4A:
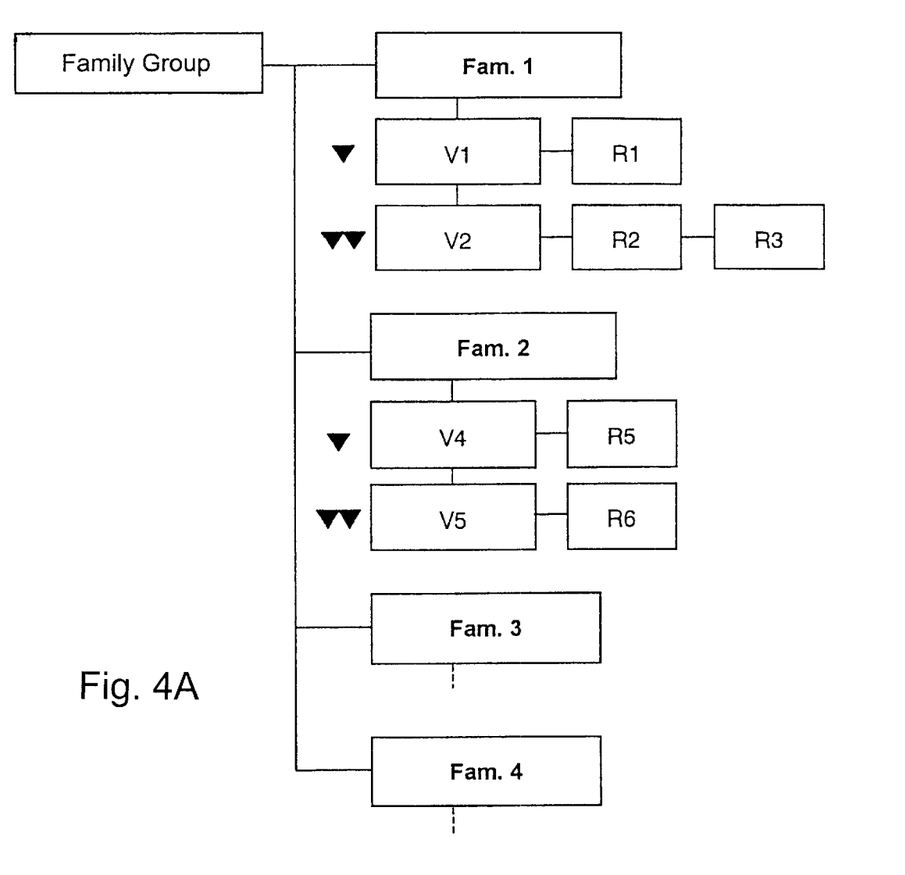
FIGS. 4a,b show a schematic view of the object structure of various electrode families and associated real or virtual electrodes for use in the machining sequence according to FIG. 3.
Figure 4B:
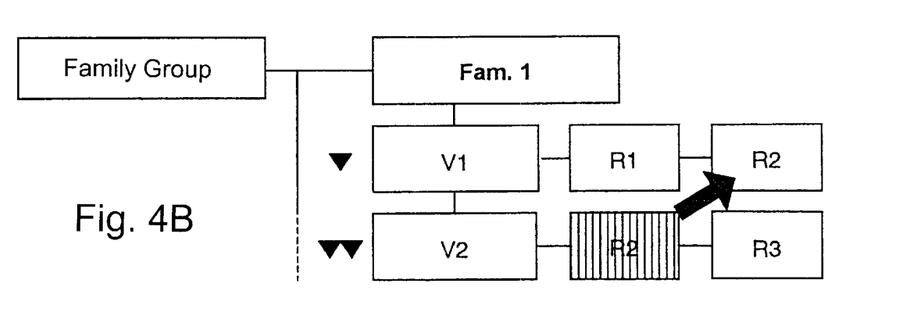

FIGS. 4a and 4b show the data structure of the electrodes as they are used for the machining sequence in FIG. 3, i.e., at the beginning of machining. of the four electrode families in FIG. 4a, only the electrode families Fam. 1 and Fam. 2 are hereby relevant. In electrode family Fam. 1, the roughing electrode used for work cycle group GR1 is determined by the assignment R1, V1; the two pre-smoothing electrodes for work cycle groups GR3 and GR4 are based on the combination of the data of the real and virtual electrodes R2, V2, and R3, V2. The roughing and pre-smoothing electrode for performing the machining job I are furthermore defined by the data combination R5, V4 or, respectively, R6, V5. Within the framework of the object-oriented structure of the entire controller of the die-sink erosion machine, an electrode family Fam. 1 and Fam. 2 have been assigned another superordinate "family group" object. As a result, the measures established for the family group apply generally also for all electrode families Fam. 1 to Fam. 4.

FIG. 4b furthermore shows the above mentioned downgrading of electrode R2 during the course of the machining sequence of FIG. 3. The real electrode R2 there is defined first by the data combination R2, V2 in the electrode family Fam. 1 as a pre-smoothing electrode ▽▽. After its life span has expired (as determined in the data of virtual electrode V2), R2 is downgraded to a roughing electrode ▽. The total description as a roughing electrode is simply obtained by assigning to it the data of the already existing virtual electrode V1 which according to the invention already contains all information for performing a roughing process.

FIGS. 5 to 9 show further examples of machining sequences generated in accordance with the criteria according to the invention.

Figure 5:
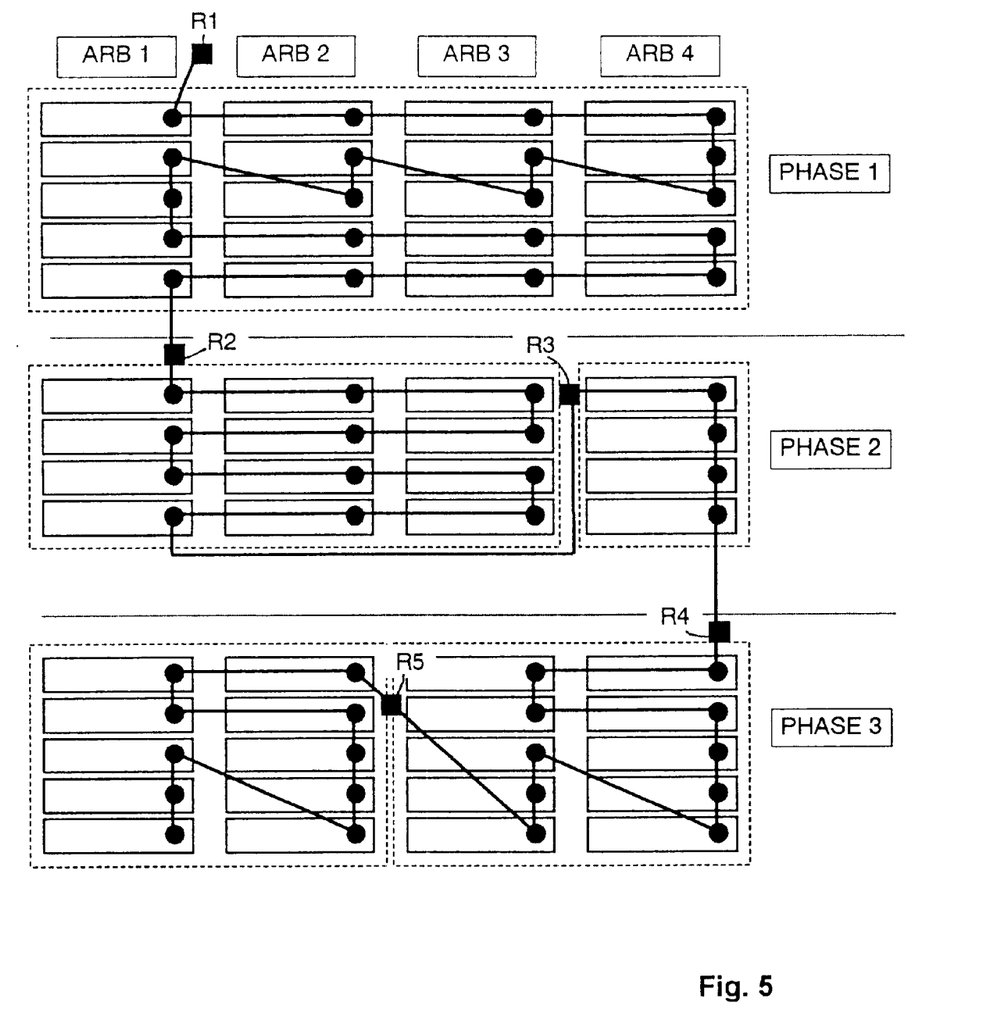
FIG. 5 shows a schematic view of another example of a machining sequence according to the invention.

The machining sequence with five electrodes R1 to R5 according to FIG. 5 resembles the one in FIG. 3. Here too the "phase 0" strategy for performing four machining jobs ARB 1 to ARB 4 is predefined in the control device.

With this, the first work steps of consecutive work cycles of machining jobs ARB 1 to ARB 4 will always be performed first in each phase 1, 2, and 3. However, the following settings have been selected as criteria for the electrode life span and wear distribution of the electrodes: For phase 1 (roughing), a wear limit of a maximum of four smoothing cycles has been predefined, whereby the even wear distribution is only desired for the last two work steps of the respective work cycles; in phase 2 (pre-smoothing), a maximum of three cycles are predefined for the pre-smoothing electrode, whereby the even wear distribution should be performed for all work cycles within the wear distribution groups; and in phase 3 (smoothing), a maximum of two smoothing cycles are predefined per electrode, whereby the wear distribution is blocked during the last three work steps of the respective work cycles. Based on these sequence predefinitions, the control device generates the machining sequence shown in FIG. 5, whereby the electrode administration automatically performs an electrode change at the points symbolized by a square box.

Figure 6:
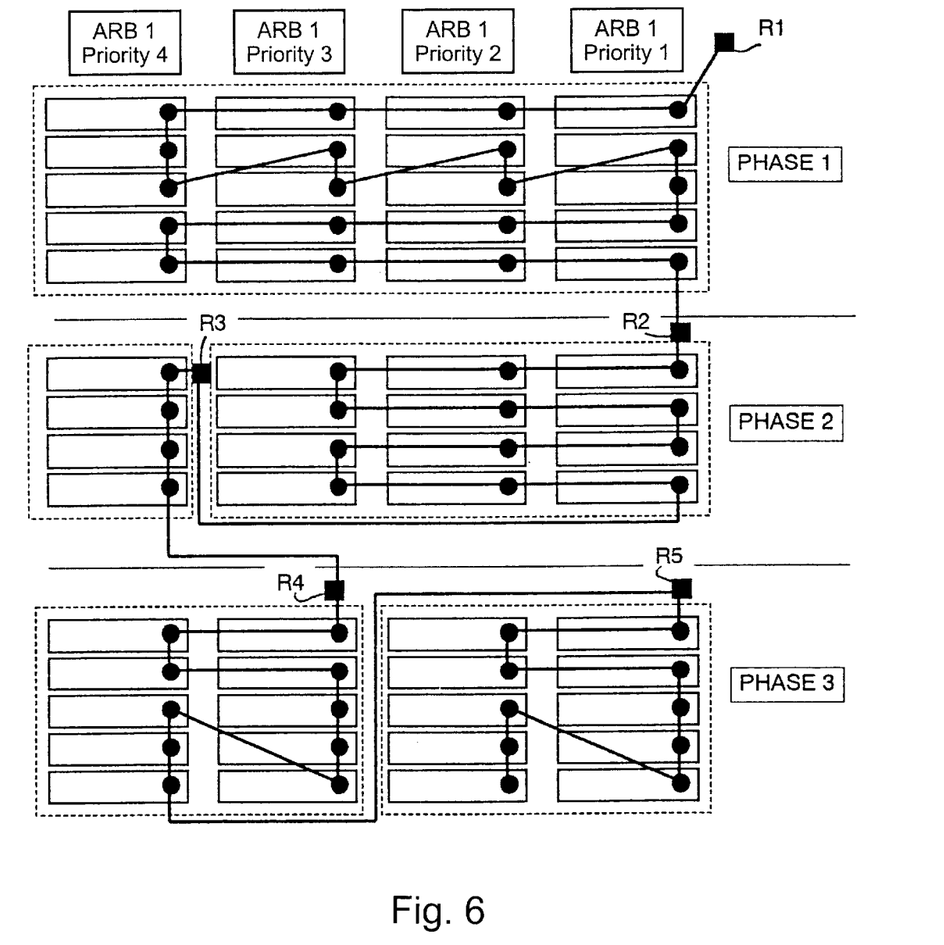
FIG. 6 shows a schematic view of another example of a machining sequence according to the invention.

The machining sequence shown in FIG. 6 is in so far comparable to the one in FIG. 5, in that the same setting for the electrode life spans and wear distribution has been selected there, and the first work steps of the machining jobs also are always performed consecutively according to the "phase 0" strategy. However, jobs ARB 1 to ARB 4 here are supposed to be performed with a priority that incrementally decreases from ARB 4 to ARB 1, so that the machine operator here has set the priority strategy "phase 0-workpiece". In contrast to the purely "phase 0" strategy in FIG. 5, the work steps are then performed in the wear distribution groups in the order of the priorities of the machining jobs, i.e., from ARB 4 to ARB 1. The wear distribution groups are also divided in each phase in the order of the priorities of the machining jobs.

Figure 7:
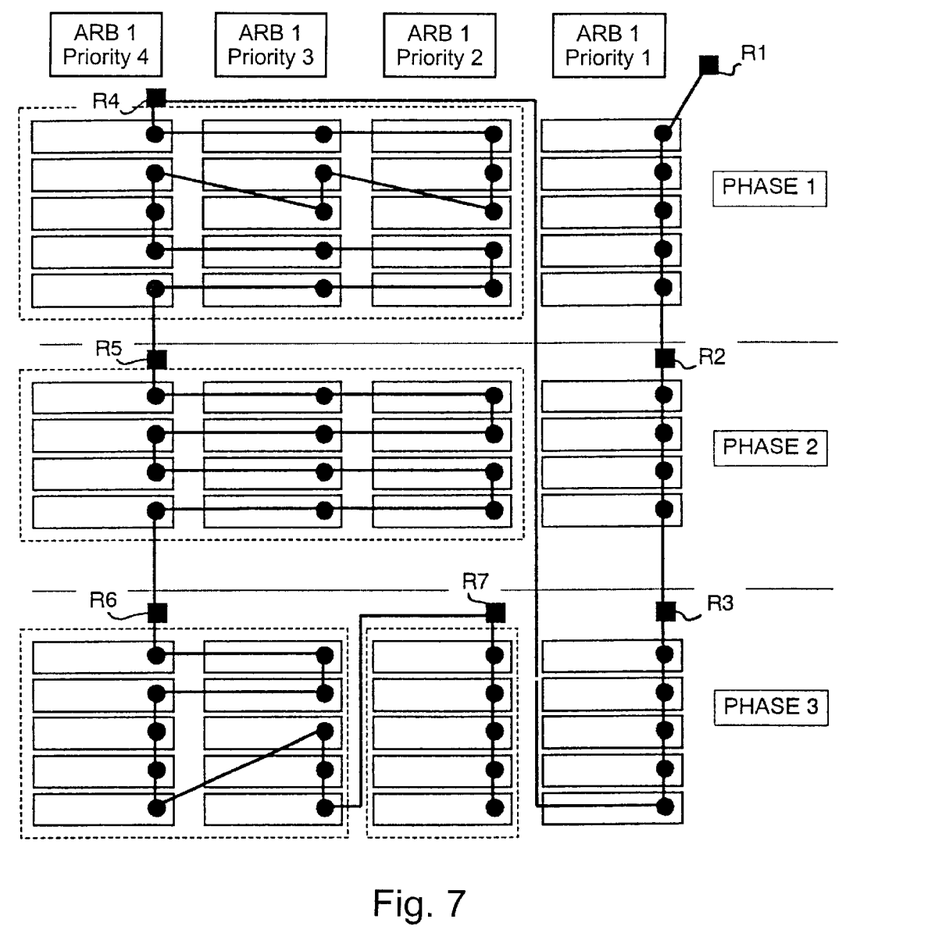
FIG. 7 shows a schematic view of another example of a machining sequence according to the invention.

The machining sequence with electrodes R1 to R7 shown in FIG. 7 is also based on the same life span and wear distribution setting as in the machining sequences in FIG. 5 and 6. The difference, however, is the predefining of priorities of the machining jobs, i.e., the priority performance of machining job ARB 4 (priority: 1) before the other machining jobs ARB 1 to ARB 3 (priority: 2). The latter machining jobs ARB 1 to ARB 3 with the same priority should be completed as specified in the machining sequence in FIG. 5. The setting of the machining sequence therefore is based on the "workpiece-phase 0" strategy, according to which all work cycles of phases 1 to 3 of the priority machining job ARB 4 are performed, and then the remaining machining jobs ARB 1 to ARB 3 are completed according to the "phase 0" strategy with the set wear distribution (cf. FIG. 5).

Figure 8:
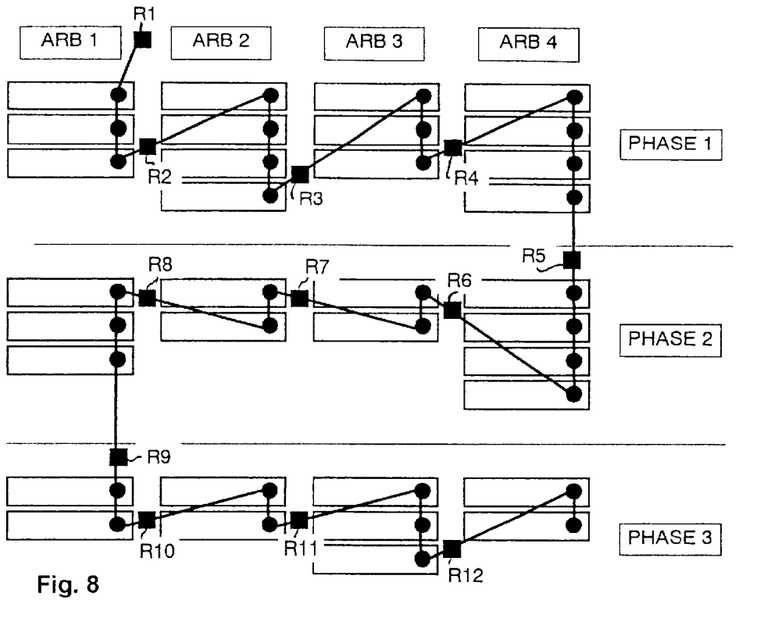
FIG. 8 shows a schematic view of another example of a machining sequence according to the invention.
Figure 9:
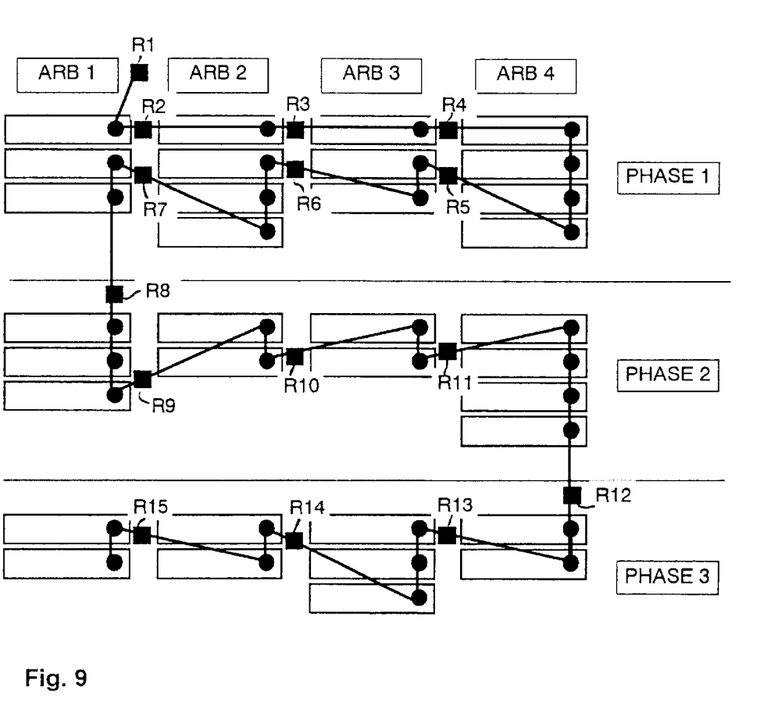
FIG. 9 shows a schematic view of another example of a machining sequence according to the invention; and, FIG. 10 shows a schematic view of a control system for generating and executing machining sequences for performing one or more workpiece machining jobs.

Finally, FIGS. 8 and 9 show machining sequences for performing different machining jobs ARB 1 to ARB 4. The wear distribution is not set here for these sequences. The machining sequence in FIG. 8 is based on the setting of the "phase" strategy, and the sequence in FIG. 9 on the "phase 0" strategy.

Figure 10:
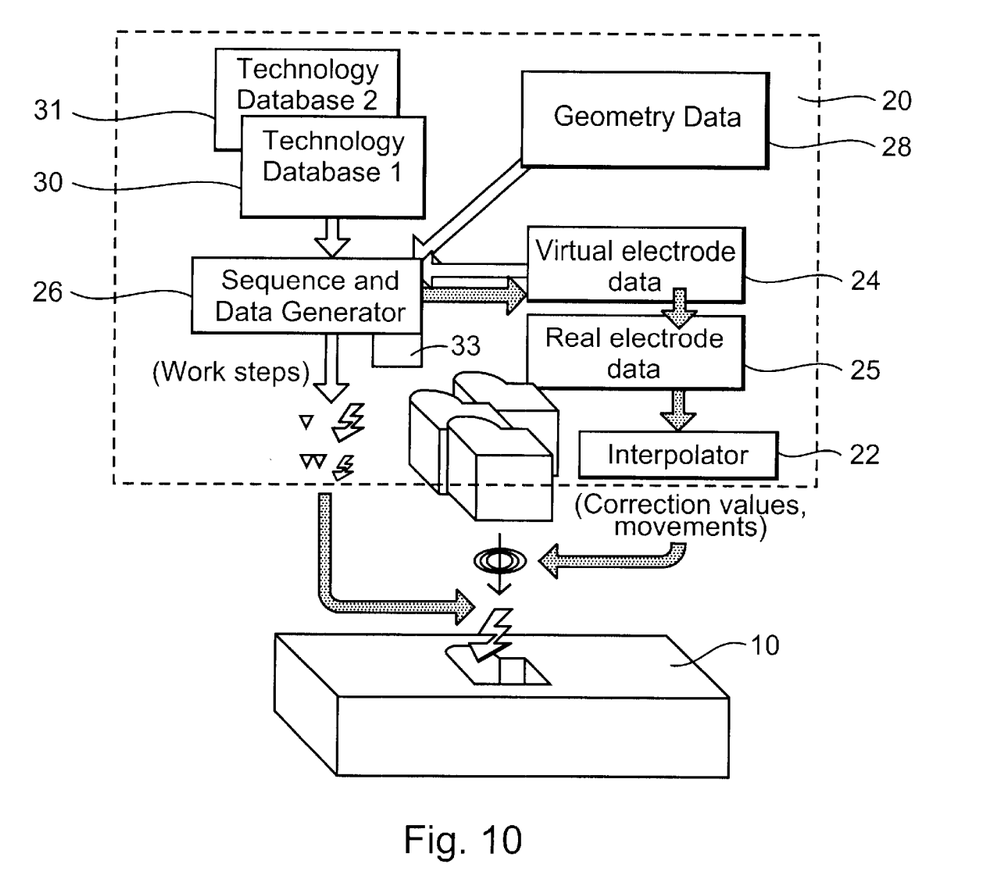

The control device according to the invention is based on a CNC control. FIG. 10 shows a schematic of a control system 20 of a CNC controller of the die-sink erosion machine for generating and executing machining sequences for performing various machining jobs on a workpiece 10. The control system 20 has an interpolator 22 that controls the relative movement between workpiece and sinker electrode necessary for the workpiece machining. For this purpose, a drive is provided that is, for example, coupled with the tool table, is movable in x, y, and z main axis direction, and receives the control signals of the interpolator 22. The control system 20 requires a control program which, in addition to the positional data of the workpiece(s), geometry and contour data of the desired die-sinks, also contains technology data, such as machining precision, roughness, etc., and process parameter data, such as erosion current, pulse current, pulse frequency, flushing data, etc., i.e., for each work step of a predefined machining sequence. The die-sink erosion machine's control system 20 according to the invention automatically generates the machining sequence of the work steps along with the associated control data. For this purpose, the control system 20 has a graphical interface (not shown) through which predefined settings for creating the machining sequence, such as machining priorities, electrode life span, wear distribution strategies are selected and set in corresponding windows. The data of the virtual electrodes (abstract electrode data) are also stored in memory 24, and the data of the real electrodes (specific electrode data) are stored in memory 25 of control system 20. The geometry and contour data of various machining jobs are furthermore stored in memory 28, and various technology and process parameter data sets for performing the machining jobs are stored in databases 30 and 31. An intelligent sequence and data generator 26 now, on the basis of the predefined sequence specifications, the data of the virtual electrodes from memory 24, the geometry data from memory 28, and the technology and process data from databases 30, 31 automatically determines a specific sequence of work steps to be performed with the respective technology and process parameter data. This assignment step is shown schematically in FIG. 5 with the light arrows.

The CNC control of the die-sink erosion machine also has an electrode administration unit (33) for monitoring the electrode life span and for excluding or downgrading an expired electrode in the previously described manner.

At the moment the work steps defined in this manner are performed (cf. dark arrows in FIG. 5), the interpolator 22 accesses the real data stored in memory 25 and reads the data for controlling the electrode movement. The data of the real electrodes are hereby integrated as correction values into the already defined work steps: the correction values, for example, determine the zero point position of the real electrodes related to the zero point of the electrode head; the actual smaller than specified size of the electrodes is used to control the planetary movements.

The present invention has been described with reference to a preferred embodiment. However, it will be readily apparent to those skilled in the art that it is possible to embody the invention in specific forms other than as described above without departing from the spirit of the invention. The exemplary embodiment is illustrative and should not be considered restrictive in any way. The scope of the invention is given by the appended claims, rather than the preceding description, and all variations and equivalents which fall within the range of the claims are intended to be embraced therein.

What is claimed is:

1. A method for controlling multiple machining processes in a die-sink erosion machine with several identical or different electrodes, comprising the steps of:

automatically determining a machining sequence of a plurality of the machining processes and the electrode used for each machining process with consideration of the following predefined criteria:

a) predefined priorities of workpieces to be machined, of a group of machining jobs, of individual machining jobs, of work cycles or work steps of a machining job; and b) predefined life span of the electrodes used for the individual machining jobs, work cycles or work steps; and performing the determined machining sequence of the machining processes.

2. The method as claimed in claim 1, wherein in the case of several identical machining jobs, the machining processes are distributed in such a way over several machining jobs that an even distribution of the electrode wear over a specific number of work cycles or work steps of the multiple machining jobs is obtained.

3. The method as claimed in claim 2, wherein the multiple, identical machining jobs of a wear distribution area are performed consecutively in a certain order, and, after a first or last machining job, are repeated in reverse order until all work steps of the machining jobs have been completed.

4. The method as claimed in claim 2, wherein the maximum electrode wear is predefined by the maximum number of work cycles or work steps that can be completed with this electrode, whereby this number at the same time determines the group(s) of work cycles or work steps in which the wear distribution strategy is used.

5. The method as claimed in claim 4, wherein within a group of work cycles only selected parts of work steps are subject to the wear distribution strategy.

6. The method as claimed in claim 1, wherein during the machining the number of completed work cycles or work steps is counted and registered, and that a specific electrode, after reaching the predefined maximum electrode wear, is excluded from further machining or downgraded to another electrode category.

7. The method as claimed in claim 6, wherein the electrodes are described in an administration system of the control device with a current machining status, whereby this status is adapted in relation to the electrode wear.

8. The method as claimed in claim 1, wherein data for describing the electrodes are divided in the control device into:

abstract electrode data describing a standard electrode that contain information for performing a certain machining process; and specific electrode data for conforming the abstract electrode data to the actually used electrode or to machine-specific characteristics, whereby an electrode description is obtained by linking the abstract electrode data with the specific electrode data.

9. The method as claimed in claim 8, wherein for a sequence of work cycles, each having different work steps, an electrode is determined by combining the abstract electrode data with various selected specific electrode data within a specific machining job for each work cycle and/or each work step.

10. The method as claimed in claim 1, wherein the machining sequence is determined as a matter of priority by the priorities assigned to the workpieces, groups of machining jobs, and individual machining jobs within a group (the "workpiece strategy").

11. The method as claimed in claim 1, wherein, the machining sequence of machining jobs are performed in several machining phases and in each machining phase the work steps of a machining job are combined into work cycles, wherein the machining sequence is determined as a matter of priority by the fact that all work steps of all machining jobs are performed in a predefined hierarchy of the machining phases, whereby, a) in each machining phase all work steps are performed from the beginning to the end of a machining job, then all work steps are performed from the beginning to the end of the next machining job, etc., until the last machining job (the "phase 0 strategy"); or, b) in each machining phase first all first work steps of all machining jobs are performed, and then the remaining work steps of the machining jobs are completed as under the phase 0 strategy defined above in a).

12. The method as claimed in claim 1, wherein the machining sequence is determined as a matter of priority by the priority of a workpiece and a strategy predefined for the workpiece.

13. The method as claimed in claim 1, wherein the machining sequence is determined as a matter of priority by the priorities assigned to the individual work steps.

14. The method as claimed in claim 10, wherein the machining sequence is set as a matter of priority specified by the "workpiece" strategy, whereby the workpieces, groups or machining jobs are completed with same priority according to a "phase" or "phase 0" strategy.

15. The method as claimed in claim 10, wherein the machining sequence is according to a "phase" or "phase 0" strategy influenced to the extent that the sequence of work steps and the order of the division of the wear distribution groups take into account the priority of the machining jobs according to the "workpiece" strategy.

* * * * *